(12) United States Patent
Bartolomé Rodrigo et al.

(10) Patent No.: US 11,350,267 B2
(45) Date of Patent: May 31, 2022

(54) METHOD OF OBTAINING USER SUBSCRIPTION DATA PERTAINING TO A SUBSCRIBER IN A TELECOMMUNICATION NETWORK

(71) Applicant: Telefonaktiebolaget LM Ericsson (publ), Stockholm (SE)

(72) Inventors: Maria Cruz Bartolomé Rodrigo, Madrid (ES); Antonio Alonso Alarcon, Madrid (ES); Daniel Otero Alfonso, Alcalá de Henares (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

(21) Appl. No.: 16/629,753

(22) PCT Filed: Aug. 13, 2018

(86) PCT No.: PCT/EP2018/071926
§ 371 (c)(1),
(2) Date: Jan. 9, 2020

(87) PCT Pub. No.: WO2019/034610
PCT Pub. Date: Feb. 21, 2019

(65) Prior Publication Data
US 2020/0178062 A1     Jun. 4, 2020

Related U.S. Application Data

(60) Provisional application No. 62/545,189, filed on Aug. 14, 2017.

(51) Int. Cl.
*H04W 4/00* (2018.01)
*H04W 8/18* (2009.01)
(Continued)

(52) U.S. Cl.
CPC ............... *H04W 8/18* (2013.01); *H04W 8/06* (2013.01); *H04W 8/12* (2013.01); *H04W 60/04* (2013.01)

(58) Field of Classification Search
CPC ............................... H04W 8/18; H04W 40/24
See application file for complete search history.

(56) References Cited

U.S. PATENT DOCUMENTS 7,730,034 B1 * 6/2010 Deflaux .................. G06F 16/25
   707/654
9,961,624 B1 * 5/2018 Zait ........................ H04W 48/16
(Continued)

FOREIGN PATENT DOCUMENTS

WO        03053088 A1    6/2003

OTHER PUBLICATIONS

"3GPP TS 23.335 v14.0.0", 3rd Generation Partnership Project; Technical Specification Group Core Network and Terminals; User Data Convergence (UDC); Technical realization and information flows; Stage 2 (Release 14), Mar. 2017, pp. 1-39.
(Continued)

*Primary Examiner* — Shantell L Heiber
(74) *Attorney, Agent, or Firm* — Murphy, Bilak & Homiller, PLLC (57) ABSTRACT

A method of obtaining user subscription data pertaining to a subscriber in a telecommunication network, said method comprising the steps of receiving, by a coexistence function, a trigger from a Network Function, NF, said trigger indicating a need for user subscription data pertaining to said subscriber, determining, by said coexistence function, that said user subscription data is not available in a Unified Data Repository of said telecommunication network, obtaining, by said coexistence function, said user subscription data from a user data repository, upon said determining that said
(Continued)

user subscription data is not available with said unified data repository, wherein said user data repository and said unified data repository are accessible by two separate communication interfaces, and transmitting, by said coexistence function, to said NF, said obtained user subscription data. A corresponding coexistence function and computer program product are also presented herein.

14 Claims, 5 Drawing Sheets (51) Int. Cl.
H04W 8/06 (2009.01)
H04W 8/12 (2009.01)
H04W 60/04 (2009.01)

(56) References Cited

U.S. PATENT DOCUMENTS

| | | | |
|---|---|---|---|
| 2005/0020259 A1* | 1/2005 | Herrero | H04W 8/12 455/433 |
| 2011/0126261 A1* | 5/2011 | Maes | G06F 21/6218 726/1 |
| 2014/0195514 A1* | 7/2014 | Stein | G06F 16/256 707/722 |
| 2015/0379060 A1* | 12/2015 | Levandoski | G06F 16/2322 707/607 |
| 2017/0150332 A1* | 5/2017 | Palanisamy | H04W 4/14 |
| 2018/0020418 A1* | 1/2018 | Chandramouli | H04W 16/14 |
| 2020/0187106 A1* | 6/2020 | Salkintzis | H04W 48/00 |

OTHER PUBLICATIONS

"3GPP TS 23.501 V1.2.0", 3rd Generation Partnership Project; Technical Specification Group Services and System Aspects; System Architecture for the 5G System; Stage 2 (Release 15), Jul. 2017, pp. 1-164.

"3GPP TS 29.335 V14.0.0", 3rd Generation Partnership Project; Technical Specification Group Core Network and Terminals; User Data Convergence (UDC); User Data Repository Access Protocol over the Ud interface; Stage 3 (Release 14), Mar. 2017, pp. 1-22.

"3GPP TS 23.502 V0.5.0", 3rd Generation Partnership Project; Technical Specification Group Services and System Aspects; Procedures for the 5G System; Stage 2 (Release 15), Jul. 2017, pp. 1-153.

* cited by examiner

METHOD OF OBTAINING USER SUBSCRIPTION DATA PERTAINING TO A SUBSCRIBER IN A TELECOMMUNICATION NETWORK

FIELD OF THE INVENTION

The disclosure generally relates to a Fifth Generation, 5G, telecommunication network, and more specifically to a method of obtaining user subscription data from a data repository in a 5G telecommunication network.

BACKGROUND

The Fifth Generation, 5G, telecommunications system is under standardization by the Third Generation Partnership Project, 3GPP. A disruptive change is already agreed wherein traditional peer-to-peer interfaces and protocols are modified by a so-called Service Based Architecture, SBA, comprising a plurality of Network Functions, NFs, where each NF provides one or multiple services as a producer to one or multiple consumers, by means of a protocol that is under evaluation in 3GPP stage 3.

A User Data Management, UDM, function in a layered architecture, such as a telecommunication network consists of a UDM-Front End, FE, and a database. This database in 5G Technical Specifications, TSs, is named as Unified Data Repository, 5G UDR, while in the Fourth Generation, 4G, the database backend in a layered architecture was named User Data Repository, 4G UDR.

Main differences from 5G UDR compared to 4G UDR are the following:

5G UDR includes some more data that is not defined in 4G UDR such as structured data for exposure and application data.

5G UDR is modelled in SBA, and therefore offers services via Nudr interface. While 4G UDR offers a Lightweight Directory Access Protocol/Simple Object Access Protocol, LDAP/SOAP, interface, named Ud in 3GPP TS 23.335, that is only partly standardized, as long as the data model is not defined.

5G UDR architecture is based on micro-service and it is designed as a cloud native application.

Existing 4G UDR Virtual Network Functions, VNFs, have essentially been ported from a physical appliance to virtual machines without fully addressing the underlying software architecture, thereby not delivering complete separation from infrastructure, the optimal level of operational automation or the Operating Expenses, OPEX, reductions promised by Network Function Virtualization, NFV.

To fully realize the flexibility that cloud native promises, the underlying software of NFs must be architected to support any infrastructure and fully automate deployments and lifecycle events such as service creation, transparent software upgrades, dynamic scalability and simple recovery.

The present disclosure considers the case that the 5G UDR is re-architected from scratch as a cloud native application and therefore is a different product from the existing 4G UDR. In this case, service providers need a solution to be able to leverage the existing installed base of 4G UDR by providing an easy and cheap data migration solution to be able to migrate 4G UDR data to the 5G UDR.

SUMMARY

An object of the invention according to the present disclosure is to allow an existing user, already provisioned in a Fourth Generation User Data Repository, 4G UDR, to access a Fifth Generation Core, 5GC, network. Presently, there is not a solution described to allow 5GC to access 4G UDR.

Another object of the present disclosure is to allow an existing user provisioned in 4G UDR to be migrated to a Fifth Generation Unified Data Repository, 5G UDR.

A further object of the present disclosure is to avoid complex and costly data migration services and avoid the need for double provisioning in both 4G UDR and 5G UDR.

In a first aspect of the present disclosure, there is presented a method of obtaining user subscription data pertaining to a subscriber in a telecommunication network. The method comprises the steps of receiving, by an coexistence function, a trigger from a Network Function, NF, wherein the trigger indicates a need for user subscription data pertaining to the subscriber, determining, by the coexistence function, that the user subscription data is not available in a Unified Data Repository of the telecommunication network, obtaining, by the coexistence function, the user subscription data from a user data repository, upon determining that the user subscription data is not available with the unified data repository, wherein the user data repository and the unified data repository are accessible by two separate communication interfaces, and transmitting, by the coexistence function, to the NF, the obtained user subscription data.

The Fifth Generation, 5G, telecommunication network is based on a Service Based Architecture, SBA, comprising a plurality of services or Network Functions, NFs. In such an architecture, a consumer NF requests a service or certain information from a Producer/provider NF.

According to the present disclosure, there is presented a new function—the coexistence function, in the SBA domain, that identifies if a user is stored in a 4G UDR and accesses it. The coexistence function receives a request from a NF, wherein the request concerns a particular subscriber and requests particular information pertaining to the subscriber. In order to achieve it, the coexistence function first checks the Unified Data Repository, for example the 5G UDR, to see if the user details are already present in the 5G UDR. If not, the coexistence function requests the UDR, for example the 4G UDR, to provide the relevant user information.

Upon receiving such information, the coexistence function transmits the received data to the NF that requested the relevant user information. The relevant user information that is requested may be the user subscription data, for example. The relevant user information may also be any other data relating to the UE that is required by the consumer NF and that is usually available with the UDR.

The skilled person understands that a telecommunication network may have multiple core network such as 5G Core network, 5GC, an Evolved Packet Core, EPC, a 4G core or a combination thereof.

An advantage of such a method is that it allows an existing subscriber of a 4G telecommunication network to start using the 5GC. At present, there is no solution described to allow 5GC to access 4G UDR.

Existing subscribers of a telecommunication network are already populated in the 4G UDR while new 5G subscribers may be populated only in the new 5G UDR. When the 5GC is deployed, subscribers may register to the new 5G Home Subscriber Server, HSS, regardless of whether its subscriber data is stored in 4G UDR or the new 5G UDR, and the 5G HSS does not have the information to identify that. The disclosure offers a solution for the 5G HSS to access subscriber data, regardless of where it is stored.

Although the present disclosure discloses a method of accessing user subscription data from a fourth generation user data repository, the skilled person is capable of modifying the method, without applying inventive skills, such that the coexistence function may be able to access data from older generation telecommunication networks as well.

Within the scope of the present disclosure, the terms "subscriber" and "user" have been interchangeably used. The subscription data pertains to a subscriber that may have multiple UEs. Even a UE may have multiple subscription data sets. A subscriber could also be UE.

In an embodiment of the first aspect of the present disclosure, the NF is a User Data Management, UDM, function. When a subscriber is attempting to register in 5G telecommunication network, a registration request from the subscriber is forwarded to a UDM function via an Access and Mobility Function, AMF. Therefore, the trigger to retrieve user information from the UDR is sent by the UDM.

According to an embodiment, the method further comprises the step of storing, by the coexistence function, said obtained user subscription data in said unified data repository. In the previous embodiments, each time a user requires some data stored in 4G UDR, the relevant data could be requested from the 4G UDR. In certain scenarios, it may also be beneficial to store the relevant data in the 5G UDR. By doing so, the coexistence function does not have to request the data from the 4G UDR each time.

Such a storage of user subscription data may also be referred to as migration, wherein the user subscription data is migrated from the 4G UDR to the 5G UDR. Once a user is migrated, i.e. user subscription data is migrated, for any subsequent requests pertaining to the same subscriber need not request any further information from the 4G UDR.

The person skilled in the art understands that in order to store the subscription data obtained from the 4G UDR in the 5G UDR, the coexistence function may need to add or modify the obtained data in view of the different data profiles maintained by the two different repositories. Therefore, a mapping of data from one model to another may be necessary before storing, or provisioning, the retrieved data in the 5G UDR.

Such a mapping may involve, for example, conversion of a data model, changes in syntaxes or schemes, addition of data, modification of data and/or deletion of data.

In an embodiment, the method further comprises the step of sending, by said coexistence function, an indicator to said user data repository of said telecommunication network, wherein said indicator is arranged to indicate that user subscription data pertaining to a subscriber has been migrated to a unified data repository of said telecommunication network, after said step of storing has been performed.

The 5G UDR may send an indicator arranged to indicate that a particular set of user data has been migrated to the 5G UDR. This serves the purpose of indicating to any further consumer NFs that request data from the 4G UDR that the data pertaining to the UE has been migrated to the 5G UDR. Such an indicator could be a flag, for example. This flag could also be used to allow administrative deletion/cleaning of migrated users when the 5G UDR is proven to work properly for migrated subscribers.

In an embodiment of the first aspect of the present disclosure, the indicator further instructs said user data repository to remove user subscription data pertaining to said subscribers, from said user data repository. Alternately, an indicator sent to the 4G UDR may also instruct the 4G UDR to delete the user subscription data pertaining to the subscriber from the 4G UDR after successful migration of the data to the 5G UDR.

According to an embodiment, the trigger received by said coexistence function, is generated when a subscriber tries to register in said telecommunication network. In the most common scenario, the trigger requesting the user subscription data is generated by a UDM function when a subscriber tries to register in the 5G network for the first time. Alternately, other scenarios may also be considered wherein another consumer NF sends the trigger to the coexistence function.

In an embodiment, the trigger received by said coexistence function, is generated by an administrator of said telecommunication network. The disclosure also allows the possibility of a mass migration, wherein data pertaining to multiple UEs are migrated simultaneously from a 4G UDR to a 5G UDR. The trigger for such a mass migration may be supplied by an administrator of the telecommunication network and may be provided during the deployment of such a network. Such a migration need not be based on subscriber activity, but administratively programmed for as many subscribers as required to be migrated.

In a second aspect of the invention, there is presented a coexistence function in a telecommunication network, said coexistence function arranged for providing user subscription data pertaining to a subscriber in the telecommunication network, to a Network Function, NF, in said telecommunication network. The coexistence function comprises receive equipment arranged for receiving a trigger from the NF, said trigger indicating a need for user subscription data pertaining to said UE, determine equipment arranged for determining that said user subscription data is not available in a Unified Data Repository of said telecommunication network, retrieve equipment arranged for obtaining said user subscription data from said user data repository, upon determining that said user subscription data is not available with said unified data repository, and provide equipment arranged for providing said retrieved user subscription data to said NF.

The advantages of the first aspect of the disclosure being a method of obtaining user subscription data, are also inherently a part of the second aspect of the disclosure. Furthermore, it is pointed out that although the claims read as if all modules/equipments according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipments as such.

In an embodiment of the second aspect of the present disclosure, the coexistence function further comprises migrate equipment arranged for storing said obtained user subscription data in said unified data repository. The migrate equipment may further be arranged to permanently transfer the data from the 4G UDR to the 5G UDR. The migrate equipment may further be arranged to send an indicator to the 4G UDR for indicating that user subscription data pertaining to a particular subscriber has been migrated to the 5G UDR. Such an indicator could be a flag, for example. This flag could also be used to allow administrative deletion/cleaning of migrated users when the 5G UDR is proven to work properly for migrated subscribers.

In an embodiment according to the second aspect of the present disclosure, the coexistence function further comprises remove equipment, wherein said storage equipment is further arranged to provide an indicator to said remove equipment, said indicator indicating a successful migration of user subscription data, wherein said remove equipment, upon receiving said indicator, is arranged for instructing said user data repository to remove said retrieved subscription data. Such an indicator could be a flag, for example. This flag could be used to allow administrative deletion/cleaning of migrated users when the 5G UDR is proven to work properly for migrated subscribers.

According to an embodiment, the coexistence function further comprises subscription data map equipment, arranged to map said retrieved data to a prescribed format before storing said user subscription data in said unified data repository.

The data that is read from the 4G UDR is structured according to an internal data model, in this case it follows a Lightweight Directory Access Protocol/Directory Tree Information, LDAP/DIT. Subscription data model has not been standardized, therefore proprietary models have been defined. In such a scenario, the retrieved data should be structured according to the new 5G data model. Such a data model may be standardized in the future in order to best fit new protocol selection.

Even if not standardized, a protocol modification may imply the need of new data model needs. It is even likely that 4G subscription data model would require some adaptations to fit the 5G data model. The function of the subscription data map equipment would be to map the subscription data as read from the 4G UDR to fit the 5G data model.

The subscription data map equipment is arranged to map the subscription data pertaining to a subscriber from the 4G UDR to the 5G UDR. Such a mapping may involve, for example, conversion of a data model, changes in syntaxes or schemes, addition of data, modification of data and/or deletion of data.

According to an embodiment, the coexistence function interacts with said user data repository and said unified data repository via two different interfaces.

In an embodiment according to the second aspect of the present disclosure, the coexistence function interacts with said unified data repository via an Nudr interface and with said user data repository via a Ud interface. 5G UDR is modelled in SBA, and therefore offers services via Nudr interface. While 4G UDR offers an Lightweight Directory Access Protocol/Simple Object Access Protocol, LDAP/SOAP, interface, named Ud in 3GPP TS 23.335, that is only partly standardized, as long as the data model is not defined. Therefore, it may be advantageous to implement the coexistence function in such a way that it interacts with the two different entities—4G UDR and 5G UDR, over two different interfaces. In the 3GPP standardisation procedure, the interfaces are also referred to as reference points.

According to an embodiment, the coexistence function is integrated in a further Network Function, NF, of said telecommunication network. The coexistence function may be collocated with the UDM or be considered a module of a multi-layered cloud data layer in the same way as 4G UDR and 5G UDR. It may also be implemented as component of the 5G UDR itself.

In a third aspect of the present disclosure, there is presented a computer program product, comprising a computer readable storage medium storing instructions which when executed on at least one processor cause said at least one processor to carry out the method according to any of the embodiments of the first aspect of the present disclosure.

In this aspect of the disclosure, a computer readable storage medium is provided with instructions that enable a system onto which said storage medium has been loaded to perform the method according to the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
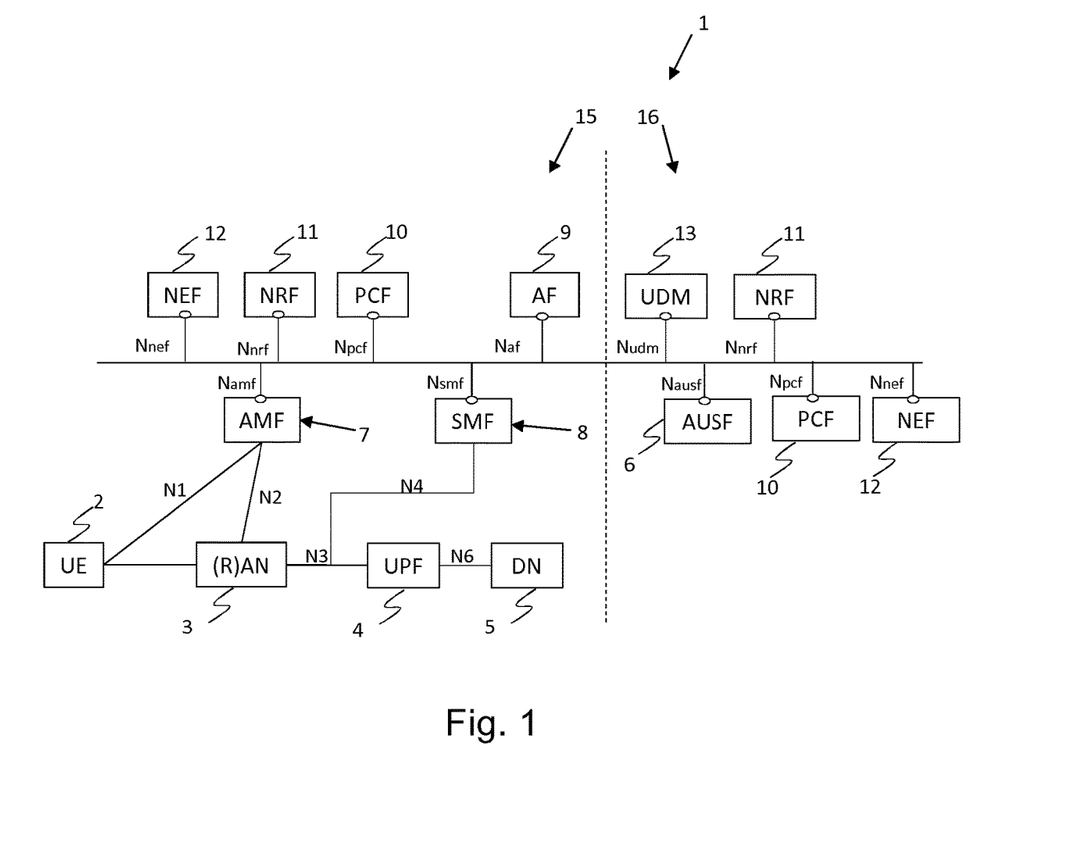
FIG. 1 schematically illustrates a part of the architecture of a Fifth Generation, 5G, telecommunication network.

FIG. 1 schematically illustrates a part of the architecture of a Fifth Generation, 5G, telecommunication network, 1. In FIG. 1, reference numeral 1 indicates a reference architecture for a 5G system. The 5G system architecture comprises the following Network Functions, NFs:

Authentication Server Function, AUSF, 6
Access and Mobility Management Function, AMF, 7
Data network, DN, e.g. operator services, Internet access or 3rd party services, 5
Network Exposure Function, NEF, 12
NF Repository Function, NRF, 11
Policy Control Function, PCF, 10
Session Management Function, SMF, 8
Unified Data Management, UDM, 13
User Plane Function, UPF, 4
Application Function, AF, 9
User Equipment, UE, 2
(Radio) Access Network, (R)AN, 3.

The functional description of these network functions is specified in clause 6 of the 3GPP standard 23.501, "System Architecture for the 5G system", the contents of which are included herein, by reference. Specifically, in FIG. 1, reference numeral 1 indicates the system architecture for a 5G telecommunication network in a roaming case. That is, the UE 2 is not in the telecommunication network where it originally belongs to, i.e. is registered. The UE 2 is originally registered with a home network 16, but is presently located in a visited network 15. Such a representation is shown merely for illustrative purposes and is not a limitation of the teachings according to the present disclosure.

Figure 2:
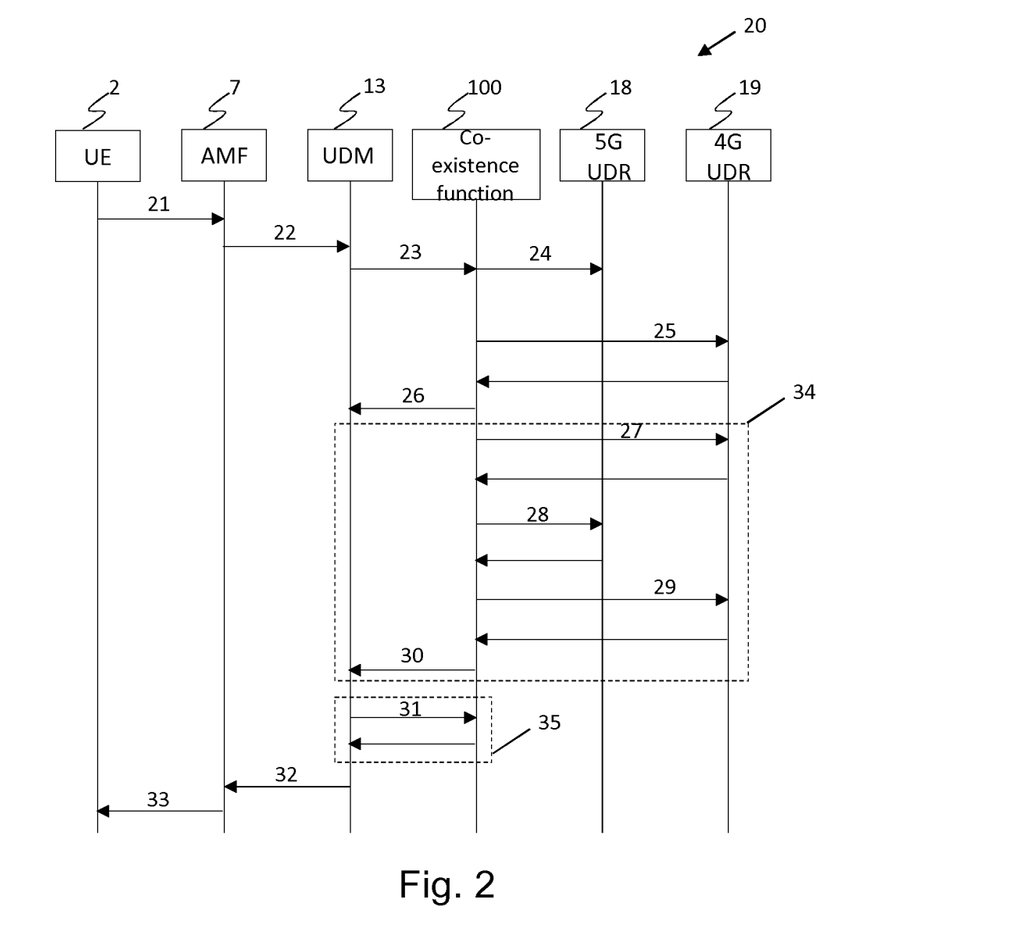
FIG. 2 schematically illustrates a method according to the present disclosure.

FIG. 2 schematically illustrates an exemplary method 20 according to the present disclosure. A coexistence function 100 is introduced. One of the objectives of the coexistence function is to be able to access the data in the User Data Repository, 4G UDR, and provide it to the Unified Data Repository, 5G UDR. A UE 2 initially registers 21 to an AMF 7. In this example, this may be the first time this UE 2 accesses the 5G Core Network, 5GC. Furthermore, in this example, subscriber data for this UE 2 is provisioned in 4G UDR 19.

The AMF 7 registers 22 to UDM 13, by invoking Nudm_UE Context Management_Registration service operation. This operation 22 sets this AMF 7 as this UE 2 serving NF, and requires subscription data for the corresponding UE context is provided back to AMF in a later step 32. The subscription data to be provided is identified by the UE context such as NF type, Access type.

The UDM 13 needs to store the context for this UE 2. The UE context may be, for example AMF ID as the serving NF, Access type. In a layered architecture, the data is stored in an external database. Then, the subscription data for this UE 2 needs to be updated, but UDM 13 does not know whether this UE 2 is provisioned in 4G UDR 19 or in 5G UDR 18. The present disclosure defines a new function, 4G-5G UDR Coexistence Function, or simply the coexistence function 100. This coexistence function 100 implements the 5G Nudr interface. In the step 23, UDM 13 sends 23 request to update data by invoking Nudr_User Data Management_Update service operation offered by 4G-5G UDR Coexistence Function 100.

The Coexistence Function 100 receives the Nudr_User Data Management_Update by UDM, and it 100 directly forwards 24 that to 5G UDR. In this case, the precondition is that the user 2 is provisioned in 4G UDR 19, then the operation will fail since the subscriber index will not be found. A response message may be provided by the 5G UDR 18 indicating that the user does not exist, or more particularly indicating that subscription data pertaining to the UE 2 is not currently available with the 5G UDR 18.

Since the subscriber is not found in 5G UDR 18, the 4G-5G UDR Coexistence Function 100 identifies that the subscriber should be stored then in 4G UDR 19. This access may correspond to the first access from a 5GC, or subsequent accesses wherein the user is not migrated from 4G to 5G. Then, coexistence function 100 updates 25 subscription data in 4G UDR, using Ud interface, by LDAP Modify method. In step 30, UDM 13 is informed about a successful update. In this case, the user remains in 4G UDR 19 wherein the optional migration is not executed.

Optionally, 4G-5G UDR Coexistence Function 100 may implement as well the migration 34 of subscribers stored in 4G UDR 19 to 5G UDR 18. This migration procedure 34 has the advantage to be done at UE 2 activity, when each individual subscriber 2 requires access to its data, what signalling and processing peaks. The Coexistence Function 100 reads 27 whole user profile by Ud interface—LDAP Read.

In step 28, 4G-5G UDR Coexistence Function 100 creates that user in 5G UDR 18 by invoking Nudr_User Data Management_Create service operation. This step 28 requires a key value of this new function: subscription data model mapping from 4G to 5G. The data read from 4G UDR 19 is structured according to an internal data model, in this case it follows an LDAP DIT (tree structure). Subscription data model is not yet standardized, therefore an exemplary proprietary model has been defined. Then, the data should be structured according to the new 5G data model that may be standardized in the future, in order to best fit new protocol selection such as Hypertext Transfer Protocol/Representational State Transfer, HTTP/REST. Whether data model would be standardized is still uncertain, but if so, it may not even follow a tree structure. Even if not standardized, a protocol modification may imply the need of new database engine and new data model needs. Then, it is likely that 4G subscription data model would require some adaptations at the very least, or even a deep re-structure to fit 5G data model.

Therefore, 4G-5G UDR Coexistence Function 100 may need to map subscription data as read from 4G UDR 19 into 5G UDR 18 required data model.

Optionally, in step 29, the coexistence function 100 may mark this user as "User migrated" in 4G UDR 19, writing a new flag as subscription data of that user. This flag could be used to allow administrative deletion/cleaning of migrated users when the 5G UDR 18 is proven to work properly for migrated subscribers. In step 30, UDM 13 is informed about a successful update. In this case, the user is migrated to 5G UDR 18.

As part of the registration procedure, a subscription 35 to be notified when subscription data is modified 31 is done. If subscription data is migrated, then any data operation will be done from now on towards 5G UDR 18.

As part of the Registration procedure, the subscription data is provided 32 to the AMF 7. Such a step of providing data by the UDM 13 to the AMF 7 is known from the technical specifications for 5G technology and the skilled person is aware of how to perform such a step and hence not elaborated further. Finally in step 33, a registration accept is sent, by the AMF 7, to the UE 2.

The method 20 shown in FIG. 2 covers the case wherein a UE 2 accesses 5GC and requires to perform an Update/Modify subscription data operation, as part of a registration in UDM 13. However, the present disclosure applies equally to any use case that requires UDM 13 to start any data access operation, such as data read and subscription to data changes should as well be operations in step 3, by invoking Nudr_User Data Management_Query and Nudr_User Data Management_Subscribe.

Figure 3:
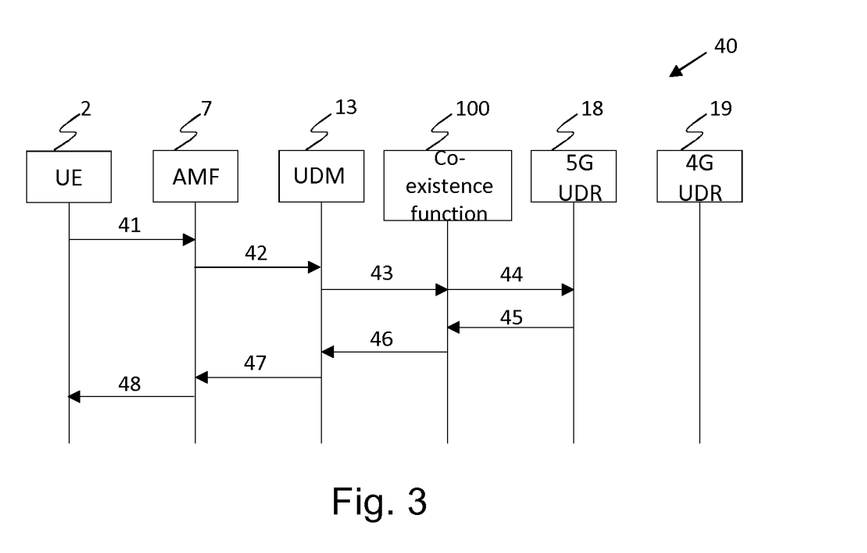
FIG. 3 schematically illustrates a method according to the present disclosure.

FIG. 3 schematically illustrates a method 40 according to the present disclosure, wherein the UE 2 has already migrated from a 4G UDR 19 to a 5G UDR 18. The method 40 applies as well to UEs 2 that are initially provisioned in the 5G UDR 18. A registration request 41 from the UE 2 is forwarded 42 by the AMF 7 to the UDM 13. IN step 43, the UDM 13 sends request to update data by invoking Nudr_User data management_update service operation offered by the coexistence function 100.

The coexistence function 100 obtains 44, 45 the requested data from the 5G UDR 18 and provides it to the UE 2 via the intermediary nodes in subsequent steps 46, 47, 48.

Figure 4:
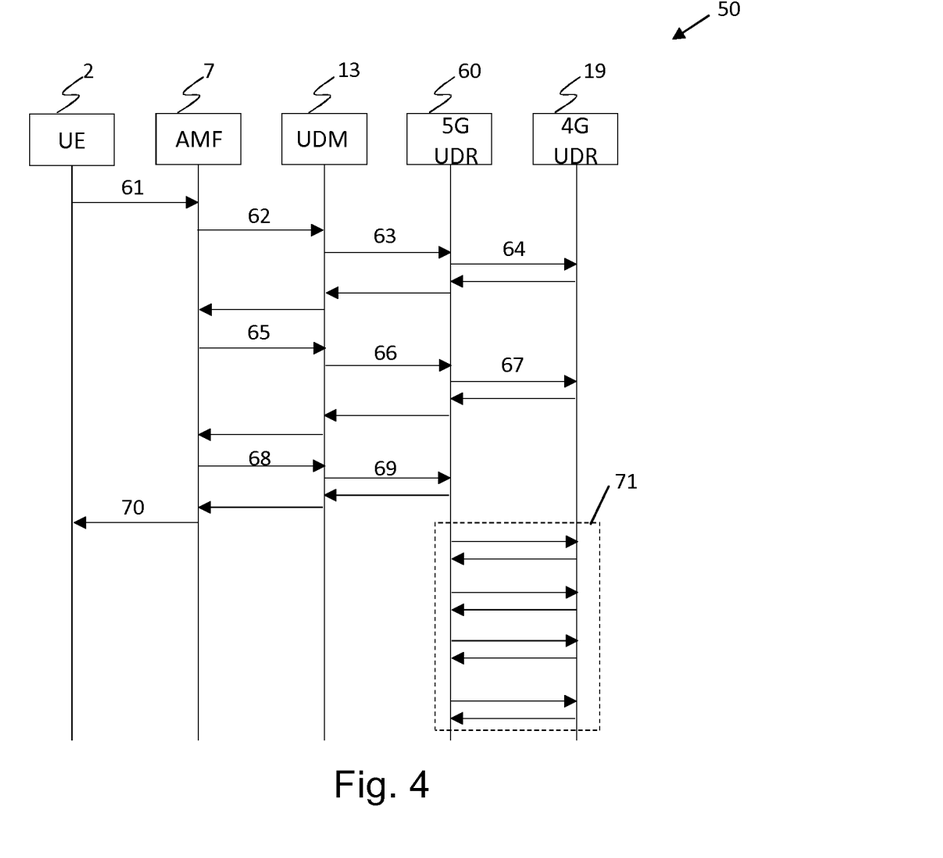
FIG. 4 schematically illustrates a method according to the present disclosure.

FIG. 4 schematically illustrates an exemplary method 50 according to the present disclosure. According to this exemplary method 50, the coexistence functionality is integrated into the 5G UDR 60. A UE 2 initially registers 61 to an AMF 7. In this example, this may be the first time this subscriber 2 accesses the 5GC. As an exemplary situation, it may be assumed that subscriber data for this subscriber 2 is provisioned in 4G UDR 19. The AMF 7 registers 62 to UDM 13, by invoking Nudm_UE Context Management_Registration service operation. This operation 62 sets this AMF 7 as this UE 2 serving NF, and requires subscription data for the corresponding UE context is provided back to AMF 68, 69. The subscription data to be provided is identified by the UE context such as NF type, Access type. The UDM 13 needs to store the context for this UE 2 such as AMF Id as the serving NF, Access type. In a layered architecture, the data is stored in an external database. Then, the subscription data for this subscriber 2 needs to be updated 63. The 5G UDR 60 detects that the subscriber is not stored in the 5G UDR 60 and updates 64 subscription data in 4G UDR 19, using Ud interface, using LDAP Modify operation. Subsequently, the AMF 7 retrieves 65 the Access and Mobility subscription data and SMF Selection Subscription data using Nudm_SDM_Get.

In step 66, UDM 13 retrieves this information from 5G UDR 60 by Nudr_UDM_Query. The 5G UDR 60 detects that the subscriber is not stored in the 5G UDR 60 and reads 67 the subscriber access and mobility data from the 4G UDR 19, using Ud interface LDAP Search operation. The AMF 7 subscribes 68 to be notified using Nudm_SDM_Subscribe when the data requested is modified. Subsequently, the UDM 13 subscribes 69 to 5G UDR 60 using Nudr_UDM_Subscribe. At the end of the process, the AMF 7 sends 70 a registration accept message to the UE 2 indicating that the Registration Request has been accepted.

The method 50 in FIG. 4 also shows a possibility of automatic data migration 71 executed by the 5G UDR 60. During a configured time window, subscribers are migrated from the 4G UDR 18 to the 5G UDR 60 using Ud interface. Once migrated, the subscriber is deleted from the 4G UDR 19. The subscriber migration rate can be configured, so that a system administrator has control of the complete migration procedure.

This method 50 in FIG. 4 covers the case the user 2 accesses 5GC and requires performing an Update/Modify subscription data operation, as part of a Registration in UDM 13. However, the disclosure applies equally to any use case that requires UDM 13 to start any data access operation, such as data read and subscription to data changes should as well as operations in step 63, by invoking Nudr_User Data Management_Query and Nudr_User Data Management_Subscribe.

The skilled person understands that the method 50 may be modified suitably to cover a scenario wherein the subscriber is initially provisioned in the 5G UDR 60, or when further requests concerning a migrated UE 2 are received. Such a modification was also explained with respect to methods 20 and 40 illustrated in FIGS. 2 and 3 respectively.

Figure 5:
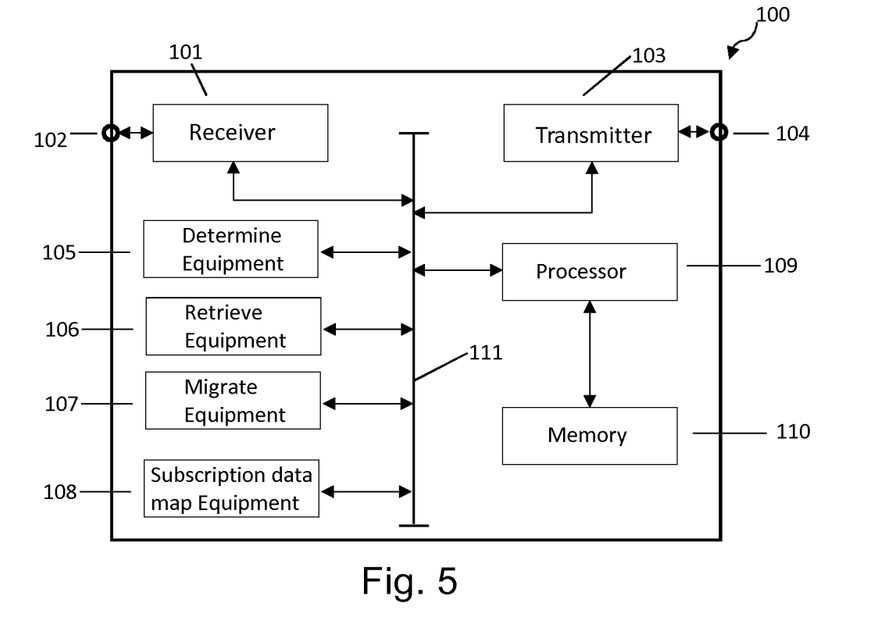
FIG. 5 schematically illustrates a coexistence function according to the present disclosure.

FIG. 5 schematically illustrates a coexistence function 100 according to the present disclosure. The coexistence function 100 comprises a receiver 101, 102 arranged to receive signals from other devices in the communication network. The function 100 also comprises transmitting means 103, 104 arranged to transmit signal to other devices in the communication network. It may be understood by the skilled person that the receiver 101, 102 and transmitter 103, 104 are separately shown merely for illustrative purposes. The combined functionality may be achieved by a transceiver, for example.

The receiver 101, 102 may further be arranged for receiving a trigger from an NF. In most cases, the NF is the UDM. The trigger indicates a need for user subscription data pertaining to a UE in the telecommunication network. The existence function 100 further comprises determine equipment 105 arranged for determining that user subscription data pertaining to a particular UE is not available in a Unified Data Repository of said telecommunication network.

The retrieve equipment 106 in the coexistence function is arranged for obtaining user subscription data from a user data repository, upon determining that user subscription data is not available with unified data repository. The transmitter 103, 104 may further be arranged for providing the retrieved user subscription data to the consumer NF. The coexistence 100, optionally also comprises migrate equipment 107 which is arranged for storing the obtained user subscription data in the 5G UDR.

Optionally, the coexistence function 100 further comprises subscription data map equipment 108, arranged to map retrieved data to a prescribed format before storing user subscription data in the 5G UDR.

Such a mapping may involve, for example, conversion of a data model, changes in syntaxes or schemes, addition of data, modification of data and/or deletion of data.

The coexistence function 100 further comprises processor 109 and memory 110. The memory may be arranged to store a computer program product which when executed by the processor 109 causes the device 100 to perform a method according to the present disclosure. The internal components communicate with one another using an internal bus 111.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method, performed by a coexistence function in a telecommunications network comprising a 4G unified data repository and a 5G user data repository arranged for storing user subscription data, for obtaining user subscription data pertaining to a subscriber in the telecommunication network, said method comprising:
   receiving, from a Network Function (NF) in the telecommunications network, a trigger indicating a request for user subscription data pertaining to a subscriber in the telecommunication network, wherein the NF is a User Data Management (UDM) function;
   determining that said requested user subscription data is not available in said 4G unified data repository by checking, by said coexistence function, said 4G unified data repository for said user subscription data;
   upon determining that said user subscription data is not available in said 4G unified data repository, obtaining said requested user subscription data from said 5G user data repository, wherein said 5G user data repository and said 4G unified data repository are accessed by said coexistence function via separate communication interfaces; and
   transmitting, to said NF, said obtained user subscription data.

2. The method according to claim 1, further comprising storing said obtained user subscription data in said 4G unified data repository.

3. The method according to claim 2, further comprising, after storing said obtained user subscription data, sending, to said 5G user data repository, an indicator arranged to indicate that the user subscription data pertaining to the subscriber has been migrated to the 4G unified data repository.

4. The method according to claim 3, wherein said indicator further instructs said 5G user data repository to remove the user subscription data pertaining to the subscriber from said 5G user data repository.

5. The method according to claim 1, wherein said trigger is generated when a subscriber tries to register in said telecommunication network.

6. The method according to claim 1, wherein said trigger is generated by an administrator of said telecommunication network.

7. A non-transitory, computer-readable medium storing program instructions that, when executed by at least one processor, configure the coexistence function to perform operations corresponding to the method of claim 1.

8. A coexistence function configured to obtain user subscription data pertaining to a subscriber in a telecommunication network comprising a 4G unified data repository and a 5G user data repository arranged for storing user subscription data, said coexistence function comprising:
    a processor; and
    a memory storing computer-executable instructions that, when executed by the processor, configure the coexistence function to:
        receive, from a Network Function (NF) in the telecommunications network, a trigger indicating a request for user subscription data pertaining to a subscriber in the telecommunication network, wherein the NF is a User Data Management (UDM) function;
        determine that said requested user subscription data is not available in said 4G unified data repository by checking said 4G unified data repository for said user subscription data;
        upon determining that said user subscription data is not available with said 4G unified data repository, obtain said requested user subscription data from said 5G user data repository, wherein said 5G user data repository and said 4G unified data repository are accessed by said coexistence function via separate communication interfaces; and
        transmit, to said NF, said obtained user subscription data.

9. The coexistence function according to claim 8, wherein execution of the instructions further configures the coexistence function to store said obtained user subscription data in said 4G unified data repository.

10. The coexistence function according to claim 9, wherein execution of the instructions further configures the coexistence function to map said retrieved data to a prescribed format before storing said user subscription data in said 4G unified data repository.

11. The coexistence function according to claim 9, wherein execution of the instructions further configures the coexistence function to, after storing said obtained user subscription data, send, to said 5G user data repository, an indicator arranged to indicate that the user subscription data pertaining to the subscriber has been migrated to the 4G unified data repository.

12. The coexistence function according to claim 11, wherein said indicator further instructs said 5G user data repository to remove the user subscription data pertaining to the subscriber from said 5G user data repository.

13. The coexistence function according to claim 8, wherein said coexistence function accesses said 4G unified data repository via an Nudr interface and accesses said 5G user data repository via a Ud interface.

14. The coexistence function according to claim 8, wherein said trigger is generated according to one of the following:
    when a subscriber tries to register in said telecommunication network, or
    by an administrator of said telecommunication network.

* * * * *